US012670449B2

(12) United States Patent
Mukherjee et al.

(10) Patent No.: US 12,670,449 B2
(45) Date of Patent: Jun. 30, 2026

(54) MODIFYING A FORECASTING MODEL BASED ON QUALITATIVE INFORMATION

(71) Applicant: International Business Machines Corporation, Armonk, NY (US)

(72) Inventors: Sumanta Mukherjee, Bangalore (IN); Chandramouli Kamanchi, Guntur District (IN); Pankaj Satyanarayan Dayama, Bangalore (IN); Arindam Jati, Bengaluru (IN); Kameshwaran Sampath, Bengaluru (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 283 days.

(21) Appl. No.: 18/491,233

(22) Filed: Oct. 20, 2023

(65) Prior Publication Data

US 2025/0131345 A1     Apr. 24, 2025

(51) Int. Cl.
 *G06Q 10/00* (2026.01)
 *G06Q 10/04* (2023.01)
(52) U.S. Cl.
 CPC .................................... *G06Q 10/04* (2013.01)
(58) Field of Classification Search
 None
 See application file for complete search history.

(56) References Cited

U.S. PATENT DOCUMENTS 11,288,590 B2     3/2022  Zimmerman
2004/0204775 A1 *  10/2004  Keyes .................. G06Q 10/063
                                                705/400

(Continued)

FOREIGN PATENT DOCUMENTS

CN       112651178  A     4/2021
CN       116885792  A     10/2023
        (Continued)

OTHER PUBLICATIONS

B Kuipers, D Berleant et al. (Using Incomplete Quantitative Knowledge in Qualitative Reasoning)—AAAI, 1988—cdn.aaai.org (Year: 1988).*

(Continued)

*Primary Examiner* — Hafiz A Kassim

(74) *Attorney, Agent, or Firm* — Amin, Turocy & Watson, LLP

(57) ABSTRACT

Techniques regarding modifying a forecasting model are provided. For example, one or more embodiments described herein can comprise a modeling system, which can comprise a memory that can store computer executable components. The modeling system can also comprise a processor, operably coupled to the memory, and that can execute the computer executable components stored in the memory. The computer executable components can include an identifying component that can identify qualitative information related to a forecasting model of an operation of a system, wherein the forecasting model was generated through data obtained from the operation of the system. The computer executable components can include a modifying component that can modify the forecasting model based on intervention information generated based on the qualitative information, wherein the intervention information is associated with a prediction of the forecasting model.

20 Claims, 11 Drawing Sheets

(56)                 References Cited

U.S. PATENT DOCUMENTS

| | | | | | |
|---|---|---|---|---|---|
| 2009/0105997 | A1* | 4/2009 | Nagasaka | G06F 30/20 | |
| | | | | 703/2 | |
| 2009/0204267 | A1* | 8/2009 | Sustaeta | G06Q 10/04 | |
| | | | | 700/36 | |
| 2017/0006135 | A1* | 1/2017 | Siebel | H04L 67/10 | |
| 2020/0387818 | A1* | 12/2020 | Chan | G05B 17/00 | |
| 2020/0409322 | A1* | 12/2020 | Sanchez Del Valle | | |
| | | | | G05B 19/042 | |
| 2021/0349650 | A1* | 11/2021 | Mishra | G06F 3/0647 | |
| 2022/0237345 | A1 | 7/2022 | Yang et al. | | |
| 2022/0373981 | A1* | 11/2022 | Givot | G05B 13/042 | |
| 2023/0143565 | A1* | 5/2023 | Akai | B60G 17/015 | |
| | | | | 701/37 | |

FOREIGN PATENT DOCUMENTS

| | | | |
|---|---|---|---|
| WO | 2020197601 | A1 | 10/2020 |
| WO | 2025/082914 | A1 | 4/2025 |

OTHER PUBLICATIONS

DJ Clancy et al. (Solving complexity and ambiguity problems within qualitative simulation)—1997—cs.utexas.edu (Year: 1997).*

SE Madnick, RY Wang, YW Lee, H Zhu (Overview and framework for data and information quality research)—Journal of data and information . . . , 2009—dl.acm.org. (Year: 2009).*

Lee, et al., "Neuro-Symbolic Spatio-Temporal Reasoning," arXiv:2211. 15566v2 [cs.AI] Jan. 13, 2023, https://doi.org/10.48550/arXiv.2211. 15566.

Robinson, et al., "Physics guided neural networks for modelling of non-linear dynamics," Neural Networks vol. 154, Oct. 2022, pp. 333-345, https://doi.org/10.1016/j.neunet.2022.07.023.

Mariappan, "Understanding vortex-acoustic lock-in in gas combustors," Crunch Seminar, May 24, 2023.

Gwak, et al., "Neural Ordinary Differential Equations for Intervention Modeling," OrarXiv: 2010.08304v1 [cs.LG] Oct. 16, 2020, https://doi.org/10.48550/arXiv.2010.08304.

Yan, et al., "Neuro-symbolic Models for Interpretable Time Series Classification using Temporal Logic Description," Sep. 15, 2022, https://doi.org/10.48550/arXiv.2209.09114.

Mccleary, et al., "Design and Analysis of Time Series Experiments," Abstract, (Jun. 8, 2017, https://ideas.repec.org/b/oxp/obooks/9780190661564.html.

Jarrett, et al., "ARIMA Modeling With Intervention to Forecast and Analyze Chinese Stock Prices," Int. j. eng. bus. manag., Jan. 22, 2011, vol. 3, No. 3, 53-58.

Piller, et al., "Fuzzy Behavior Description Language: A Declarative Language for Interpolative Behavior Modeling," Acta Polytechnica Hungarica vol. 16, No. 9, Date of Conference: Apr. 25-27, 2019, DOI: 10.1109/INES46365.2019.9109451.

Deng, et al., "Integrating Machine Learning with Human Knowledge," iScience 23, 101656, Nov. 20, 2020, https://doi.org/10.1016/j.isci.2020.101656.

Smith, et al., "Semi-supervised Learning From Demonstration Through Program Synthesis: An Inspection Robot Case Study," First Workshop on Agents and Robots for reliable Engineered Autonomy 2020 (AREA '20, Sep. 4, 2020) EPTCS 319, 2020, pp. 81-101, doi:10.4204/EPTCS.319.7.

Gil, et al., "Towards Human-Guided Machine Learning," IUI '19, Mar. 17-20, 2019, Marina del Rey, CA, USA, https://doi.org/10.1145/3301275.3302324.

International Searching Authority, "Notification of Transmittal of the International Search Report and the Written Opinion of the International Searching Authority, or Declaration," Patent Cooperation Treaty, Dec. 12, 2024, 10 pages, International Application No. PCT/EP2024/078896.

* cited by examiner

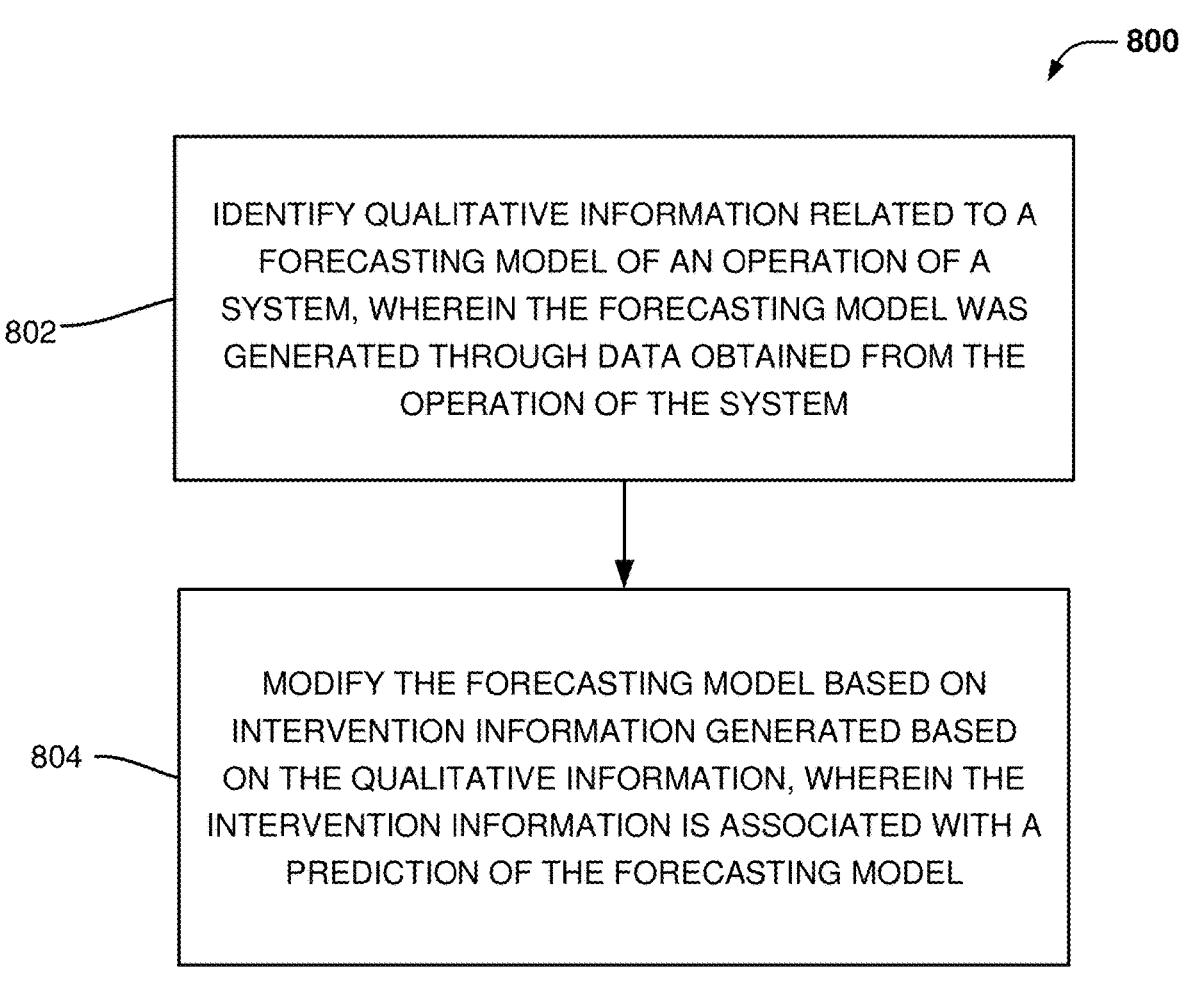

800

802 — IDENTIFY QUALITATIVE INFORMATION RELATED TO A FORECASTING MODEL OF AN OPERATION OF A SYSTEM, WHEREIN THE FORECASTING MODEL WAS GENERATED THROUGH DATA OBTAINED FROM THE OPERATION OF THE SYSTEM

804 — MODIFY THE FORECASTING MODEL BASED ON INTERVENTION INFORMATION GENERATED BASED ON THE QUALITATIVE INFORMATION, WHEREIN THE INTERVENTION INFORMATION IS ASSOCIATED WITH A PREDICTION OF THE FORECASTING MODEL

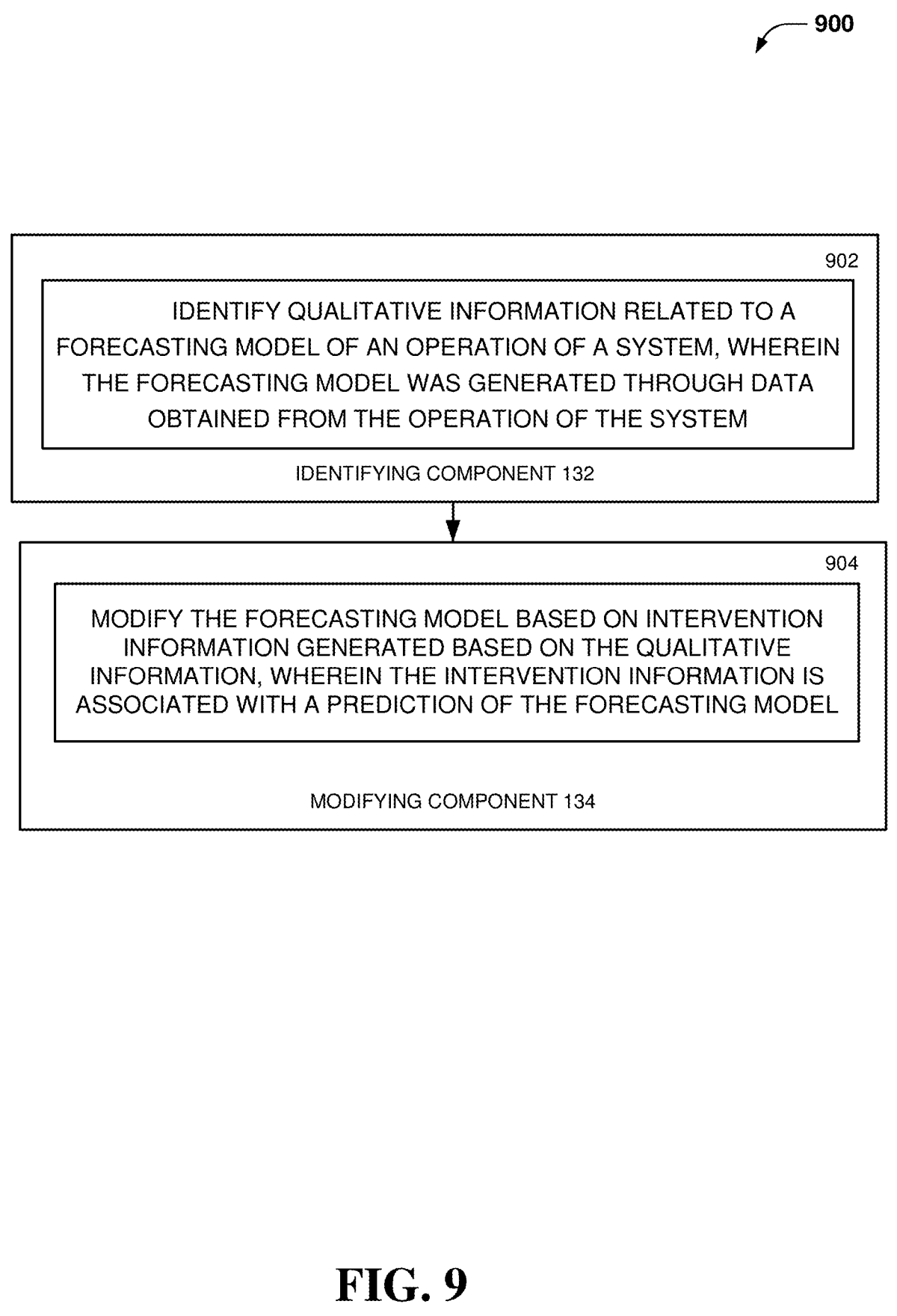

IDENTIFY QUALITATIVE INFORMATION RELATED TO A
FORECASTING MODEL OF AN OPERATION OF A SYSTEM, WHEREIN
THE FORECASTING MODEL WAS GENERATED THROUGH DATA
OBTAINED FROM THE OPERATION OF THE SYSTEM

IDENTIFYING COMPONENT 132

904

MODIFY THE FORECASTING MODEL BASED ON INTERVENTION
INFORMATION GENERATED BASED ON THE QUALITATIVE
INFORMATION, WHEREIN THE INTERVENTION INFORMATION IS
ASSOCIATED WITH A PREDICTION OF THE FORECASTING MODEL

MODIFYING COMPONENT 134

FIG. 9

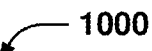
1000

PROGRAM INSTRUCTION 1002

IDENTIFY QUALITATIVE INFORMATION RELATED TO A FORECASTING MODEL OF AN OPERATION OF A SYSTEM, WHEREIN THE FORECASTING MODEL WAS GENERATED THROUGH DATA OBTAINED FROM THE OPERATION OF THE SYSTEM

PROGRAM INSTRUCTION 1004

MODIFY THE FORECASTING MODEL BASED ON INTERVENTION INFORMATION GENERATED BASED ON THE QUALITATIVE INFORMATION, WHEREIN THE INTERVENTION INFORMATION IS ASSOCIATED WITH A PREDICTION OF THE FORECASTING MODEL

COMPUTER READABLE STORAGE MEDIUM 1010

FIG. 10

MODIFYING A FORECASTING MODEL BASED ON QUALITATIVE INFORMATION

BACKGROUND

One or more embodiments relate to forecasting models, and more specifically, to modifying forecasting models.

SUMMARY

The following presents a summary to provide a basic understanding of one or more embodiments of the disclosure. This summary is not intended to identify key or critical elements, or to delineate any scope of particular embodiments or any scope of the claims. Its sole purpose is to present concepts in a simplified form as a prelude to the more detailed description that is presented later. In one or more embodiments described herein are, systems, computer-implemented methods, apparatuses and/or computer program products that can utilize an intermediate dataset to generate a forecasting model.

According to some embodiments described herein, a modeling system is provided. The modeling system can include a memory that stores computer executable components. The system can also include a processor, operably coupled to the memory, which can execute the computer executable components stored in the memory. The computer executable components can include an identifying component that can identify qualitative information related to a forecasting model of an operation of a system, wherein the forecasting model was generated through a dataset obtained from the operation of the system. The computer executable components can further include a modifying component that can modify the forecasting model based on intervention information generated based on the qualitative information, wherein the intervention information is associated with a prediction of the forecasting model.

In additional, or alternative embodiments, the qualitative information can include an indication that the system operates differently than has been modeled by the forecasting model. In additional, or alternative embodiments, the indication can include qualitative monotonic information regarding the operation of the system. In additional, or alternative embodiments, the computer-executable components can further include a range component that identifies a range of input values relevant to the qualitative information, wherein the intervention information is based on the range.

In additional, or alternative embodiments, the range can be identified based on the forecasting model comprising a less amount of forecasting data for the range as compared to other input values not comprised in the range, e.g., also termed 'blindspots' discussed below. In additional, or alternative embodiments, the forecasting model can include less forecasting data for the range based on a determination that testing the system based on the range was predicted to be destructive to the system. In additional, or alternative embodiments, the qualitative information converted into the intervention information can include the qualitative information converted into a declarative language.

According to one or more example embodiments, a computer-implemented method is provided. The computer-implemented method can identify qualitative information related to a forecasting model of an operation of a system, wherein the forecasting model was generated through a dataset obtained from the operation of the system. The computer-implemented method can further include modifying the forecasting model based on intervention information generated based on the qualitative information, wherein the intervention information is associated with a prediction of the forecasting model.

In additional, or alternative embodiments, the qualitative information identified by the computer-implemented method can include an indication that the system operates differently than has been modeled by the forecasting model. In additional, or alternative embodiments, the indication utilized by the computer-implemented method can include qualitative monotonic information regarding the prediction and the operation of the system. In additional, or alternative embodiments, the method can further include identifying a range of input values relevant to the qualitative information, wherein the intervention information is based on the range. In additional, or alternative embodiments, the range can be identified based on the forecasting model including a less amount of forecasting data for the range as compared to other input values not comprised in the range.

In additional, or alternative embodiments, the forecasting model can include a less amount of forecasting data for the range based on a determination that testing the system based on the range was predicted to be destructive to the system. In additional, or alternative embodiments, the forecasting model can include a data driven predictive model of the system. In additional, or alternative embodiments, the qualitative information converted by the computer-implemented method into the intervention information can include qualitative information converted into a declarative language.

According to additional or alternative embodiments, a computer program product that modify a forecasting model based on intervention information generated based on the qualitative information. The computer program product can comprise a computer readable storage medium having program instructions embodied therewith. The program instructions can be executable by a processor to cause the processor to identify qualitative information related to a forecasting model of an operation of a system, wherein the forecasting model was generated through a dataset obtained from the operation of the system. In different embodiments, the program instructions can further include modifying the forecasting model based on intervention information generated based on the qualitative information, wherein the intervention information is associated with a prediction of the forecasting model.

In additional, or alternative embodiments, the qualitative information can include an indication that the system operates differently than has been modeled by the forecasting model. In additional, or alternative embodiments, the indication can include qualitative monotonic information regarding the prediction and the operation of the system. In additional, or alternative embodiments, the operations can further include, identifying a range of input values relevant to the qualitative information, wherein the intervention information is based on the range.

Other embodiments may become apparent from the following detailed description when taken in conjunction with the drawings.

BRIEF DESCRIPTION OF THE DRAWINGS

In certain embodiments, the present invention is described with reference to accompanying figures. The figures provided herein are intended to facilitate a clear understanding of the invention and are not intended to limit the scope or functionality of the invention in any way.

FIG. 8 illustrates a flow diagram of an example, non-limiting computer-implemented method that can facilitate modifying a forecasting model based on intervention information generated based on the qualitative information, in accordance with one or more embodiments described herein.

FIG. 9 illustrates a block diagram of an example, non-limiting modeling system that can facilitate modifying a forecasting model based on intervention information generated based on the qualitative information, in accordance with one or more embodiments described herein.

FIG. 10 depicts an example computer-program product (CPP) that can include executable instructions that, when executed by a processor of a system, can facilitate governing usage of an artificial intelligence technology, in accordance with one or more embodiments.

DETAILED DESCRIPTION

Figure 1:
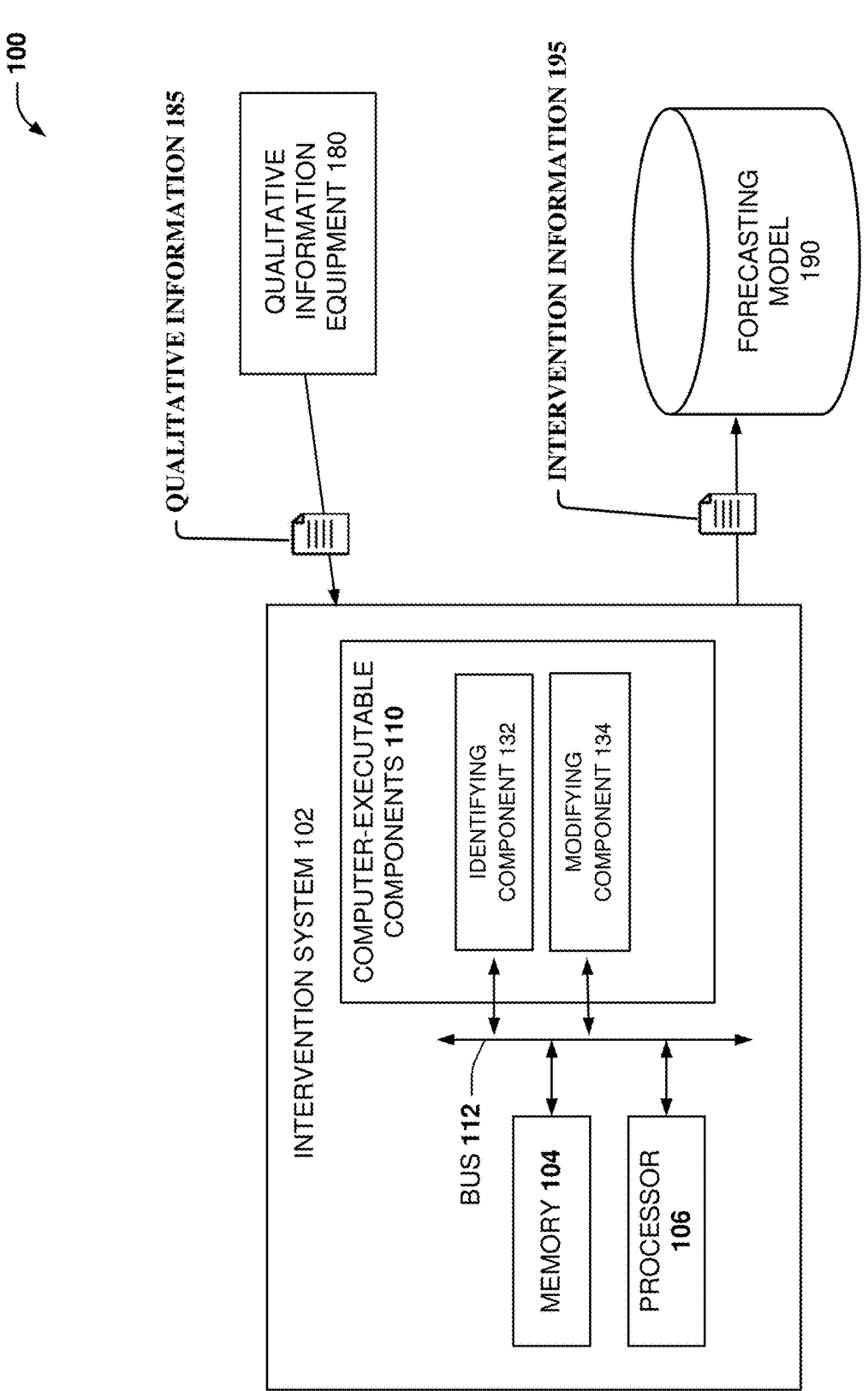
FIG. 1 illustrates a block diagram of an example modeling system that can facilitate modifying a forecasting model based on intervention information generated based on the qualitative information, in accordance with one or more embodiments described herein.

The following detailed description is merely illustrative and is not intended to limit embodiments and/or application or uses of embodiments. Furthermore, there is no intention to be bound by any expressed or implied information presented in the preceding Background or Summary sections, or in the Detailed Description section. One or more embodiments are now described with reference to the drawings, with like referenced numerals being used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details.

As described further below, one or more embodiments can facilitate modifying a forecasting model based on intervention information generated based on the qualitative information. As is understood by one having skill in the relevant art(s), given the description herein, the implementation(s) described herein are non-limiting examples, and variations to the technology can be implemented. As such, any of the embodiments, aspects, concepts, structures, functionalities, implementations and/or examples described herein are non-limiting, and the technologies described and suggested herein can be used in various ways that provide benefits and advantages to data manipulation system technology in general, both for existing technologies and technologies in this and similar areas that are yet to be developed. For instance, some of the examples described herein reference "forecasting models," which can broadly refer herein to models that can be used to solve forecasting problems, e.g., problems useful for making business decisions, such as for product assortment planning, resource scheduling, policy planning, and other problems where forecasting can be useful.

An example application for a forecasting model that is referenced from some examples herein is a forecasting model that can be used for predictive control of a system, e.g., control of an industrial process like operation of a cement mill. As used herein for predictive control capabilities, rather than passive forecasting, predictive control can utilize active forecasting, e.g., produces a future estimate under a specified future intervention/action. In some circumstances, the quality of a predictive model can depend on the quality and amount of training data available, e.g., a large amount of noiseless data with sufficient exploration of state-control space.

Examples herein describe different embodiments where a forecasting model provides predictive control to control the composition of steel generated by operation of a cement mill, given a particular operating temperature and other factors. One type of predictive model described herein, is a model that has been trained based on data (e.g., a data driven predictive model) describing the operation of the system, e.g., operation of the cement mill. In some implementations, these data driven predictive models do not need explicit knowledge of the system that is typical of a model that uses an algorithm, e.g., a mathematical model.

Even though many examples described herein discuss forecast models that can provide predictive control of a system, the technologies described herein can be used in many applicable circumstances, e.g., with different types of models that can perform different functions, as well as different types of systems having different characteristics.

FIG. 1 illustrates a block diagram of an example 100 that can facilitate modifying a forecasting model based on intervention information generated based on the qualitative information, in accordance with one or more embodiments described herein. Embodiments of systems, apparatuses or processes in various embodiments of the present disclosure can constitute one or more machine-executable components embodied within one or more machines, e.g., embodied in one or more computer readable mediums (or media) associated with one or more machines. Such components, when executed by the one or more machines, (e.g., computers, computing devices, virtual machines), can cause the machines to perform the operations described. Repetitive description of like elements and processes employed in respective embodiments is omitted for sake of brevity.

In an example embodiment depicted, intervention system 102 can receive qualitative information 185 from qualitative information equipment 180. In addition, intervention system 102 can apply intervention formation to modify forecasting model 190. In some embodiments, intervention system 102 can comprise memory 104, processor 106, and computer-executable components 110, coupled to bus 112.

In one or more embodiments, intervention system 102 can be operated using any suitable computing device or set of computing devices that can be communicatively coupled to devices, non-limiting examples of which can include, but are not limited to, a server computer, a computer, a mobile computer, a mainframe computer, an automated testing system, a network storage device, a communication device, a web server device, a network switching device, a network routing device, a gateway device, a network hub device, a network bridge device, a control system, or any other suitable computing device. A device can be any device that can communicate information with the intervention system 102 and/or any other suitable device that can employ information provided by intervention system 102 and can enable computer-executable components 110, discussed below. As depicted, computer-executable components 110 can include identifying component 132, modifying component 134, and any other components associated with intervention system 102 that can combine to provide different functions described herein.

Memory 104 can comprise volatile memory (e.g., random access memory (RAM), static RAM (SRAM), dynamic RAM (DRAM), etc.) and non-volatile memory (e.g., read only memory (ROM), programmable ROM (PROM), electrically programmable ROM (EPROM), electrically erasable programmable ROM (EEPROM), etc.) that can employ one or more memory architectures. Further examples of memory 104 are described below with reference to volatile memory 1112 of FIG. 11. Such examples of memory 104 can be employed to implement any of the embodiments described herein.

In one or more embodiments, memory 104 can store one or more computer and machine readable, writable, and executable components and instructions that, when executed by processor 106 (e.g., a classical processor, and a quantum processor), can perform operations defined by the executable components and instructions. For example, memory 104 can store computer and machine readable, writable, and computer-executable components 110 and instructions that, when executed by processor 106, can execute the various functions described herein relating to intervention system 102, including identifying component 132, modifying component 134, and other components described herein with or without reference to the various figures of the one or more embodiments described herein.

Processor 106 can comprise one or more types of processors and electronic circuitry (e.g., a classical processor, and a quantum processor) that can implement one or more computer and machine readable, writable, and executable components and instructions that can be stored on memory 104. For example, processor 106 can perform various operations that can be specified by such computer and machine readable, writable, and executable components and instructions including, but not limited to, logic, control, input/output (I/O), arithmetic, and the like. In some embodiments, processor 106 can comprise one or more central processing unit, multi-core processor, microprocessor, dual microprocessors, microcontroller, System on a Chip (SOC), array processor, vector processor, quantum processor, and another type of processor. Further examples of processor 106 are described below with reference to processor set 1110 of FIG. 11. Such examples of processor 106 can be employed to implement any aspect of embodiments described herein.

As discussed below, forecasting model 190 can have been generated from training data by a type of artificial neural network (ANN), and be stored in storage that can include, but is not limited to, RAM, ROM, EEPROM, flash memory or other memory technology, solid state drive (SSD) or other solid-state storage technology, Compact Disk Read Only Memory (CD ROM), digital video disk (DVD), Blu-ray disk, or other optical disk storage, magnetic cassettes, magnetic tape, magnetic disk storage or other magnetic storage devices, or any other medium which can be used to store information for embodiments and which can be accessed by the computer.

As depicted, memory 104, processor 106, identifying component 132, modifying component 134, and any other component of intervention system 102 described or suggested herein, can be communicatively, electrically, operatively, and optically coupled to one another via bus 112, to perform functions of intervention system 102, and any components coupled thereto. Bus 112 can comprise one or more of a memory bus, memory controller, peripheral bus, external bus, local bus, a quantum bus, and another type of bus that can employ various bus architectures. Such examples of bus 112 can be employed to implement any of the embodiments described herein. It should be noted that, when an element is referred to herein as being "coupled" to another element, it can describe one or more different types of coupling. For example, when an element is referred to herein as being "coupled" to another element, it can be described one or more different types of coupling including, but not limited to, chemical coupling, communicative coupling, capacitive coupling, electrical coupling, electromagnetic coupling, inductive coupling, operative coupling, optical coupling, physical coupling, thermal coupling, and another type of coupling.

It should be appreciated that the embodiments described herein depicted in various figures disclosed herein are for illustration only, and as such, the architecture of such embodiments are not limited to the systems, devices, and components depicted therein. For example, in some embodiments, intervention system 102 can further comprise various computer and computing-based elements described herein with reference to sections below such FIG. 11, various embodiments, components of the intervention system 102 (such as identifying component 132, and modifying component 134) can include functional elements that can be implemented via cloud technologies, physical components (for example, computer hardware) and local software (for example, an application on a mobile phone or an electronic device).

In one or more embodiments described herein, intervention system 102 can utilize identifying component 132 to perform (e.g., via processor 106) operations including, but not limited to, identifying qualitative information related to a forecasting model of an operation of a system, wherein the forecasting model was generated through a dataset obtained from the operation of the system. For example, returning to the example predictive model that can be used to operate a cement mill, qualitative information 185 can be received from qualitative information equipment 180 and identified by identifying component 132.

With reference to forecasting model 190 that can be modified as described herein, in an example, one or more embodiments can be used to supplement data driven predictive models, e.g., to improve the sensitivity of these models in certain circumstances. For example, for some systems (e.g., the operation of a cement mill), model blindspots can exist, e.g., all performance data for this system may not be practicable to collect because of the potential for dangerous and/or destructive conditions. In some circumstances, this because of the unavailability of certain data in practical scenarios, blindspots in the predictive model can lead to control regimes based on inadequate data. As described further herein, one or more embodiments can use collected qualitative information to supplement forecasting model 190 so as to reduce the amount of blindspots the model.

In some circumstances, one or more embodiments can also supplement the operation of predictive mathematical (e.g., algorithmic) models, e.g., because an exact mathematical relation is unknown for certain ranges of the system, such as ranges subject to the blindspots noted above. Other types of models that can be supplemented by one or more embodiments, include models subject to errors in system response estimation, e.g., because of certain scenarios for a system where a training data fails to model subtle system response variation due to factors including a change in control.

To generate and apply the interventions that address some of the operational aspects of forecasting model 190, in additional embodiments described herein, intervention system 102 can utilize modifying component 134 to perform (e.g., via processor 106) operations including, but not limited to modifying the forecasting model 190 based on intervention information 195 generated based on qualitative information 185, with intervention information 195 being associated with a prediction of forecasting model 190.

Figure 2:
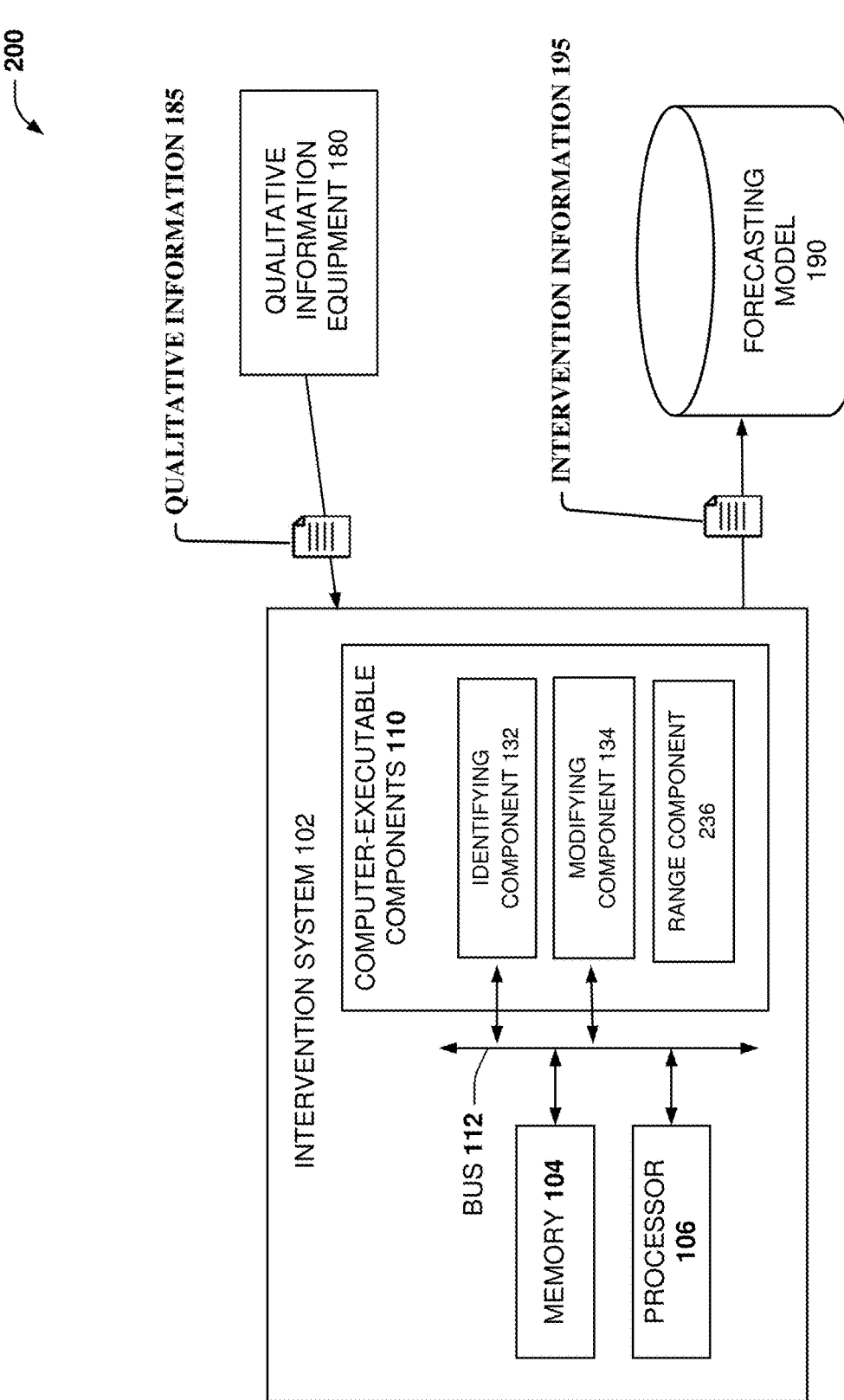
FIG. 2 illustrates a block diagram of an example modeling system that can facilitate modifying, within a particular range, a forecasting model based on the qualitative information, in accordance with one or more embodiments described herein.

FIG. 2 illustrates a block diagram of an example, example 200 that can facilitate modifying, within a particular range, a forecasting model based on the qualitative information, in accordance with one or more embodiments described herein. Repetitive description of like elements employed in one or more embodiments described herein is omitted for sake of brevity. As depicted, example 200 includes elements of example 100, with computer executable components 120 further including range component 236.

As noted above, one or more embodiments can be applied to forecasting models to improve the sensitivity of the models in certain circumstances, e.g., with blindspots or other parts of the models with less sensitivity. One or more embodiments also can operate so as to be selectively applied to only the parts of the model that are subject to restricted action variability (e.g., blindspots) or less sensitivity, e.g., applying potentially less precise qualitative information to sufficiently sensitive and data-supported parts of the forecasting model can lead to a reduction of sensitivity in these areas.

One approach that can be used by one or more embodiments of intervention system 102 to reduce the application of qualitative information to certain parts of the model, can utilize modifying component 134 to perform (e.g., via processor 106) operations including, but not limited to identifying a range of input values relevant to the qualitative information, with the intervention information being based on the range.

For example, to address blindspots in the forecasting model noted above, one or more embodiments can identify the range of input values based on the forecasting model including a less amount of forecasting data for the range as compared to other input values not comprised in the range. One approach that can be used to identify these blind-spot ranges is to determine that testing the system based on the range could be destructive to the system, e.g., this determination being included in qualitative information 185 received from qualitative information equipment 180. As described herein, selecting this range can be termed "context modeling," and the limiting of the application of intervention information 195 to this range can be termed masking the intervention. This can also be described as discretizing the sensitivity of forecasting model 190 to the qualitative intervention, e.g., when the model response will be sensed post intervention.

Figure 3:
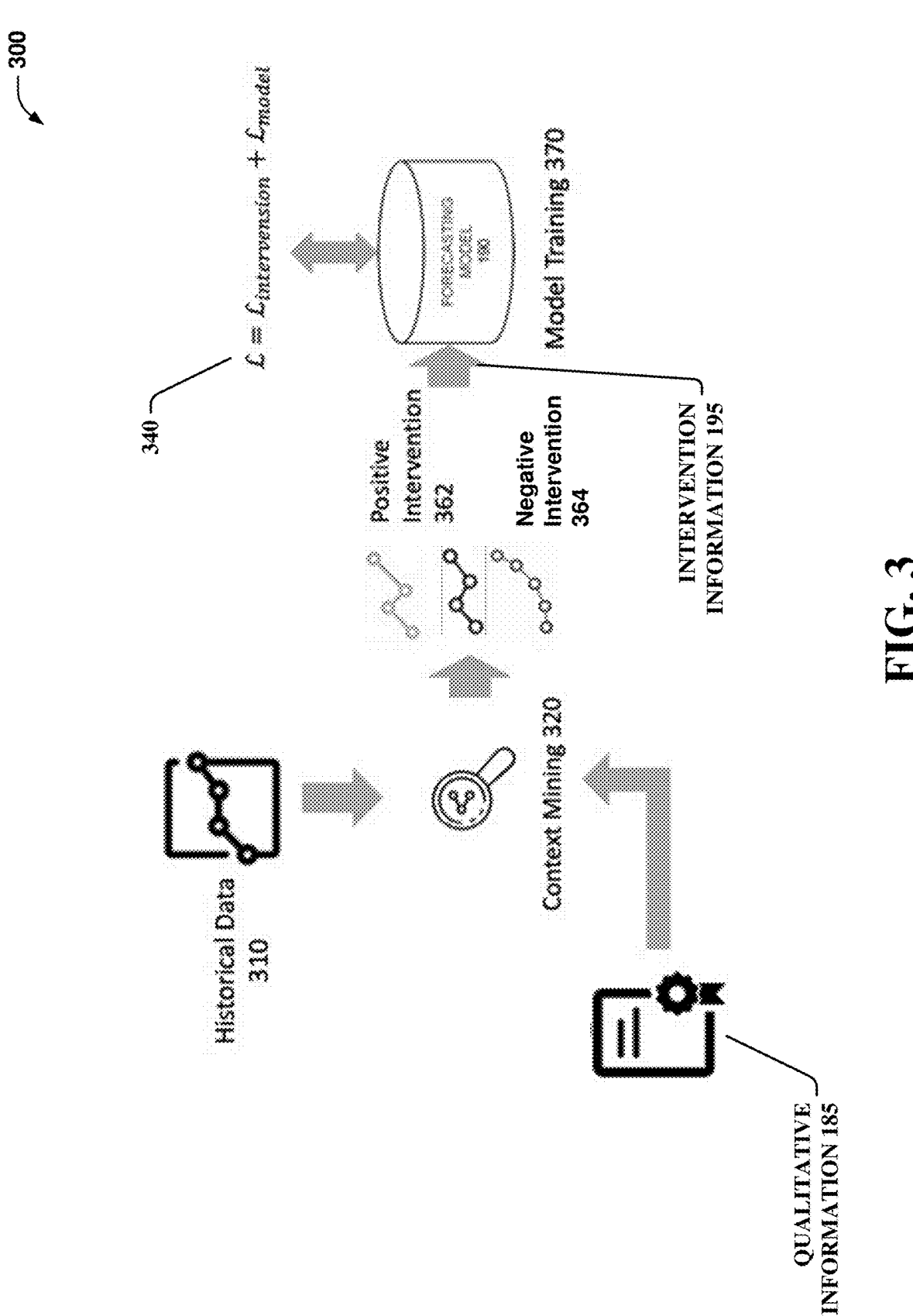
FIG. 3 illustrates a block diagram that illustrates aspects of an example modeling system that can facilitate modifying a forecasting model based on intervention information generated based on the qualitative information, in accordance with one or more embodiments described herein.

FIG. 3 illustrates a block diagram of an example 300 that can facilitate modifying a forecasting model based on intervention information generated based on the qualitative information, in accordance with one or more embodiments described herein. Repetitive description of like elements employed in one or more embodiments described herein is omitted for sake of brevity.

Example 300 can include qualitative information 185 being subject to context mining 320 (e.g., masking) and combined with historical data 310 describing the operation of the system. For example, in one or more embodiments, qualitative information 185 can include an indication that the system operates differently than has been modeled by the forecasting model for a particular range. In certain implementations, these differences can be simplified to qualitative monotonic information regarding the current prediction of forecasting model 190 and the operation of the system as specified by qualitative information 185.

Returning to the cement mill example, qualitative information 185 can specify that, contrary to the present predictions of forecasting model 190, for a particular range of input, cement production should be high.

In this example, forecasting model 190 data can be augmented by qualitative information 185 that specifies the directionality of a change, to create positive intervention 362 or negative intervention 364, e.g., qualitative monotonic information for a particular range (e.g., high thermal state) that contradicts the present model predictions for the range.

Figure 4:
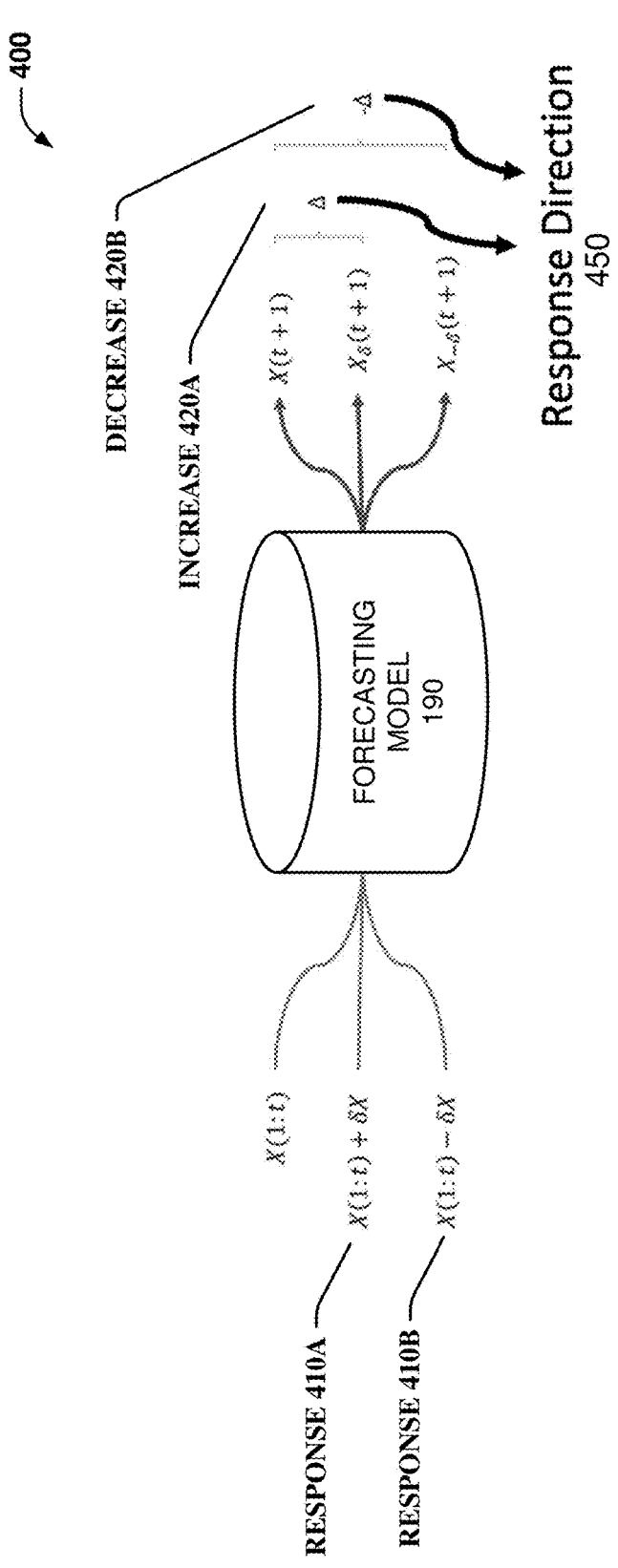
FIG. 4 illustrates a block diagram that illustrates other aspects of an example modeling system that can facilitate modifying a forecasting model based on intervention information generated based on the qualitative information, in accordance with one or more embodiments described herein.

FIG. 4 illustrates a block diagram of an example 400 that can facilitate modifying a forecasting model based on intervention information generated based on the qualitative information, in accordance with one or more embodiments described herein. Repetitive description of like elements employed in one or more embodiments described herein is omitted for sake of brevity.

In additional, or alternative embodiments, the qualitative information described above can be converted from a descriptive language into a declarative language for use in generating the intervention information, e.g., a declarative language for representing qualitative system behavior under representation.

In one or more embodiments, qualitative information can be specified in a descriptive language then can be converted into declarative language, which can be consumed by the model during model training.

An example 490 is included in FIG. 4 to show an approach to converting descriptive information into a declarative language for consumption by one or more embodiments.

Figure 5:
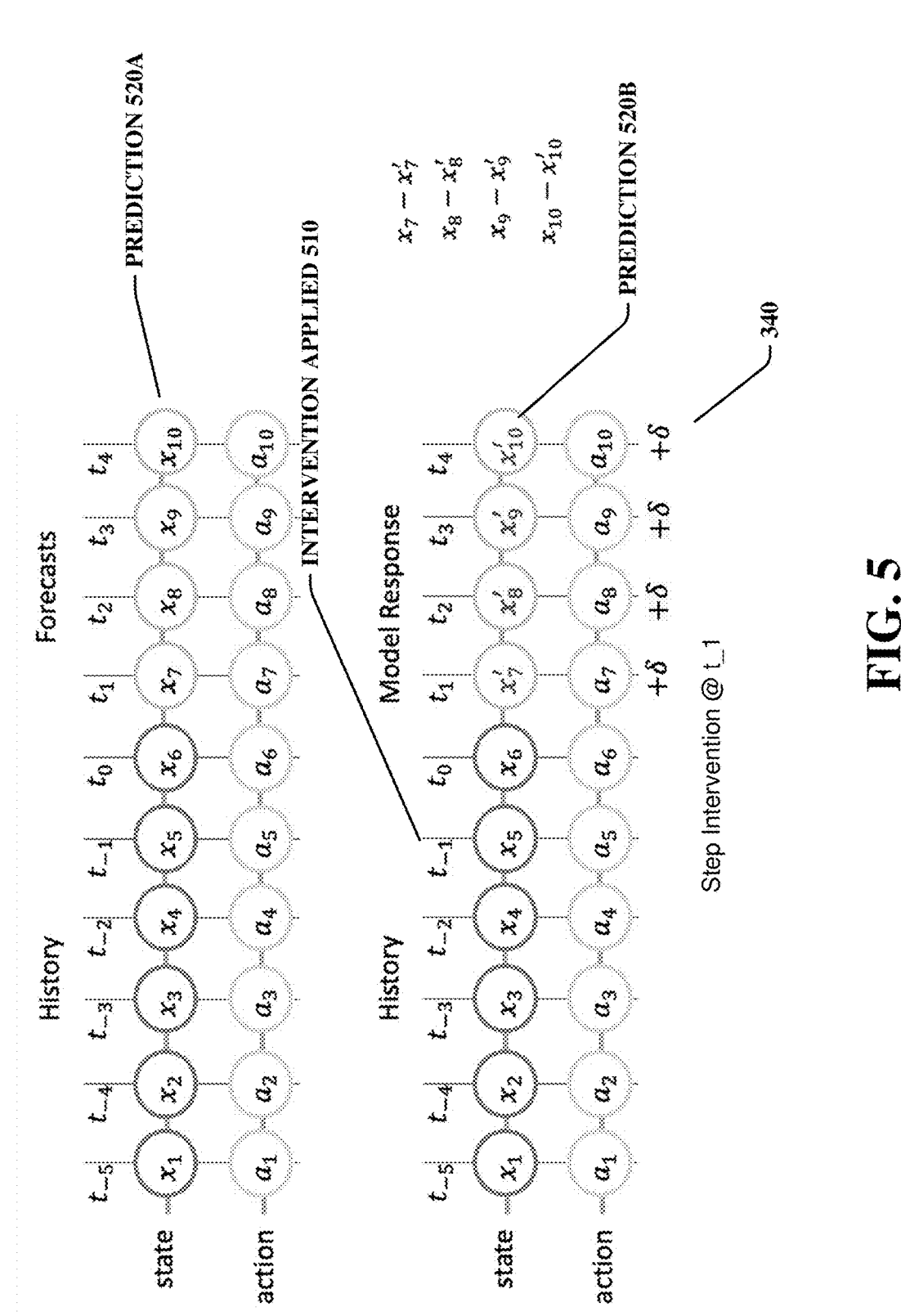
FIG. 5 illustrates a block diagram that illustrates other aspects of an example modeling system that can facilitate modifying a forecasting model based on intervention information generated based on the qualitative information, in accordance with one or more embodiments described herein.

FIG. 5 illustrates a block diagram of an example 500 that can facilitate modifying a forecasting model based on intervention information generated based on the qualitative information, in accordance with one or more embodiments described herein. Repetitive description of like elements employed in one or more embodiments described herein is omitted for sake of brevity.

As depicted, example 500 includes an example quantitation of intervention with embodiments applying a forecast model 190. One or more embodiment can evaluate a change in predictions generated by the forecasting model based on applying the intervention to the model. Stated differently, an intervention evaluation generated by embodiments can measure an effect change in a prediction as a function of intervention on a specific action variable.

As depicted, after the intervention is applied 510, the difference between prediction 520A and 520B represents an example a change in predictions generated by the forecasting model at $t_4$. In example 500, times $t_1$-$t_4$ represent an intervention location, e.g., where the intervention is applied. In some examples, a measure of model sensitivity can of the intervention can be estimated by subtracting the base response with the intervened response, e.g., prediction 520B minus prediction 520A.

One or more embodiments can guide the application of interventions to forecast models, e.g., by generating a metric for evaluating intervention modeling, one or more embodiments can generate and apply interventions based on the effectiveness of the potential different intervention characteristics. For example, FIGS. 6-7 below provide an example simulated visual and quantitative representation to facilitate analysis of intervention effects on an active forecasting model.

Figure 6:
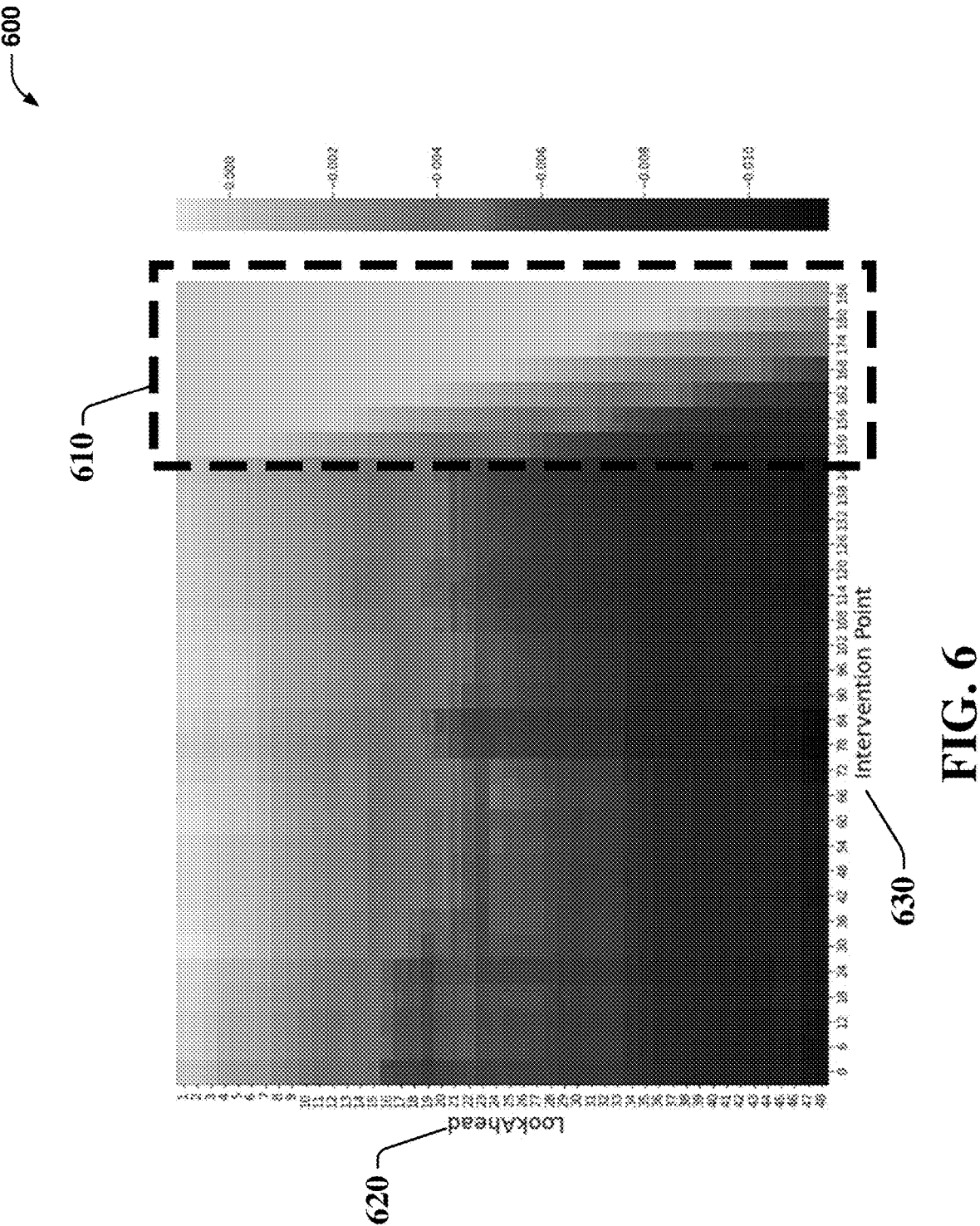
FIG. 6 includes a representation that depicts a chart showing an example variation of predicted target to be subject to intervention with qualitative information, in accordance with one or more embodiments.
Figure 7:
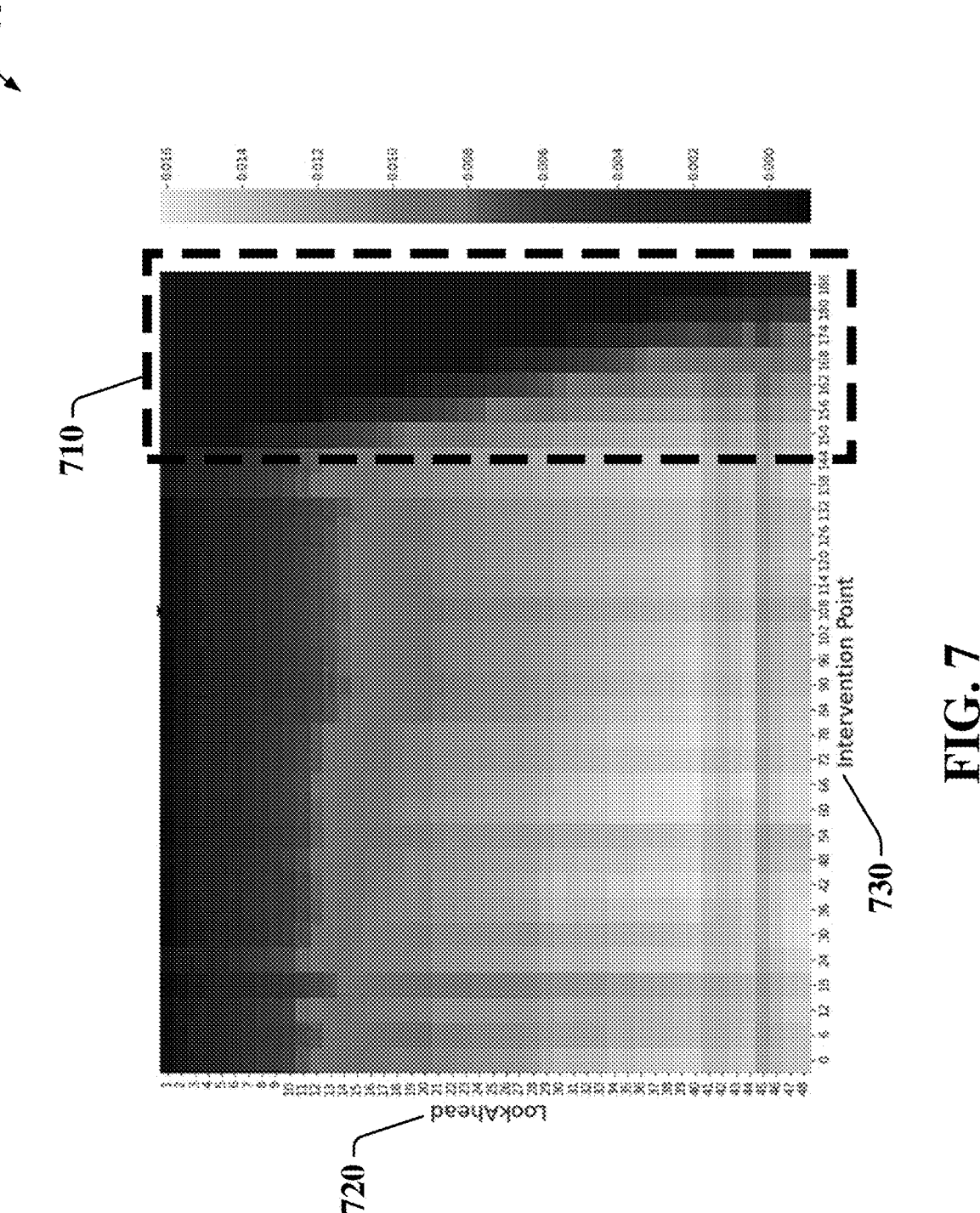
FIG. 7 includes a representation that depicts a chart showing an example variation of predicted target after an intervention with qualitative information, in accordance with one or more embodiments.

FIGS. 6-7 illustrate visual and quantitative representations 600 and 700 that can facilitate analysis of intervention effects on an active forecasting model. Repetitive description of like elements employed in one or more embodiments described herein is omitted for sake of brevity.

FIG. 6 includes representation 600 that depicts a chart showing an example variation of predicted target to be subject to intervention with qualitative information 185, in accordance with one or more embodiments. As depicted, lookahead 620 in shown on the Y-axis and intervention point 630 is shown on the X-axis.

As shown, region 610 illustrates how, without the application of qualitative information 185 by one or more embodiment, high point prediction accuracy can be achieved, but model sensitivity does not conform to the content of the qualitative information.

FIG. 7 includes representation 700 that depicts a chart showing an example variation of predicted target after an intervention with qualitative information 185, in accordance with one or more embodiments. Repetitive description of like elements employed in one or more embodiments described herein is omitted for sake of brevity.

As depicted, lookahead 720 in shown on the Y-axis and intervention point 730 is shown on the X-axis. As shown, region 710 illustrates how, without the application of qualitative information 185 by one or more embodiment, high point prediction accuracy can be achieved, but model sensitivity does not conform to the content of the qualitative information.

FIG. 8 illustrates a flow diagram of an example, non-limiting computer-implemented method 800 that can facilitate modifying a forecasting model based on intervention information generated based on the qualitative information, in accordance with one or more embodiments described herein. Repetitive description of like elements and processes employed in respective embodiments is omitted for sake of brevity.

At 802, computer-implemented method 800 can include identifying qualitative information related to a forecasting model of an operation of a system, wherein the forecasting model was generated through a dataset obtained from the operation of the system. At 804, computer-implemented method 800 can include modifying the forecasting model based on intervention information generated based on the qualitative information, wherein the intervention information is associated with a prediction of the forecasting model.

Embodiments of the subject matter and the operations described herein can be implemented in digital electronic circuitry, or in computer software, firmware, or hardware, including the structures disclosed in this specification and their structural equivalents, or in combinations of one or more of them. Embodiments of the subject matter described herein can be implemented as one or more computer programs, i.e., one or more components of computer program instructions, encoded on computer storage medium for execution by, or to control the operation of, information/data processing apparatus. Alternatively, or in addition, the program instructions can be encoded on an artificially generated propagated signal, e.g., a machine-generated electrical, optical, or electromagnetic signal, which is generated to encode information/data for transmission to suitable receiver apparatus for execution by an information/data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate physical components or media (e.g., multiple CDs, disks, or other storage devices).

FIG. 9 illustrates a block diagram of an example, non-limiting modeling system 900 that can facilitate modifying a forecasting model based on intervention information generated based on the qualitative information, in accordance with one or more embodiments described herein. Repetitive description of like elements and processes employed in respective embodiments is omitted for sake of brevity.

At 902 of FIG. 9, identifying component 132 can identify qualitative information related to a forecasting model of an operation of a system, with the forecasting model being generated through a dataset obtained from the operation of the system. At 904 of FIG. 9, modifying component 134 can modify the forecasting model based on intervention information generated based on the qualitative information, wherein the intervention information is associated with a prediction of the forecasting model.

FIG. 10 depicts an example 1000 computer-program product (CPP) that can include executable instructions that, when executed by a processor of a system, can facilitate governing usage of an artificial intelligence technology, in accordance with one or more embodiments. For purposes of brevity, description of like elements and/or processes employed in other embodiments is omitted.

In one or more embodiments, operation 1002 of FIG. 10 can identify qualitative information related to a forecasting model of an operation of a system, with the forecasting model being generated through a dataset obtained from the operation of the system. In one or more embodiments, operation 1004 of FIG. 10 can modify the forecasting model based on intervention information generated based on the qualitative information, wherein the intervention information is associated with a prediction of the forecasting model.

Figure 11:
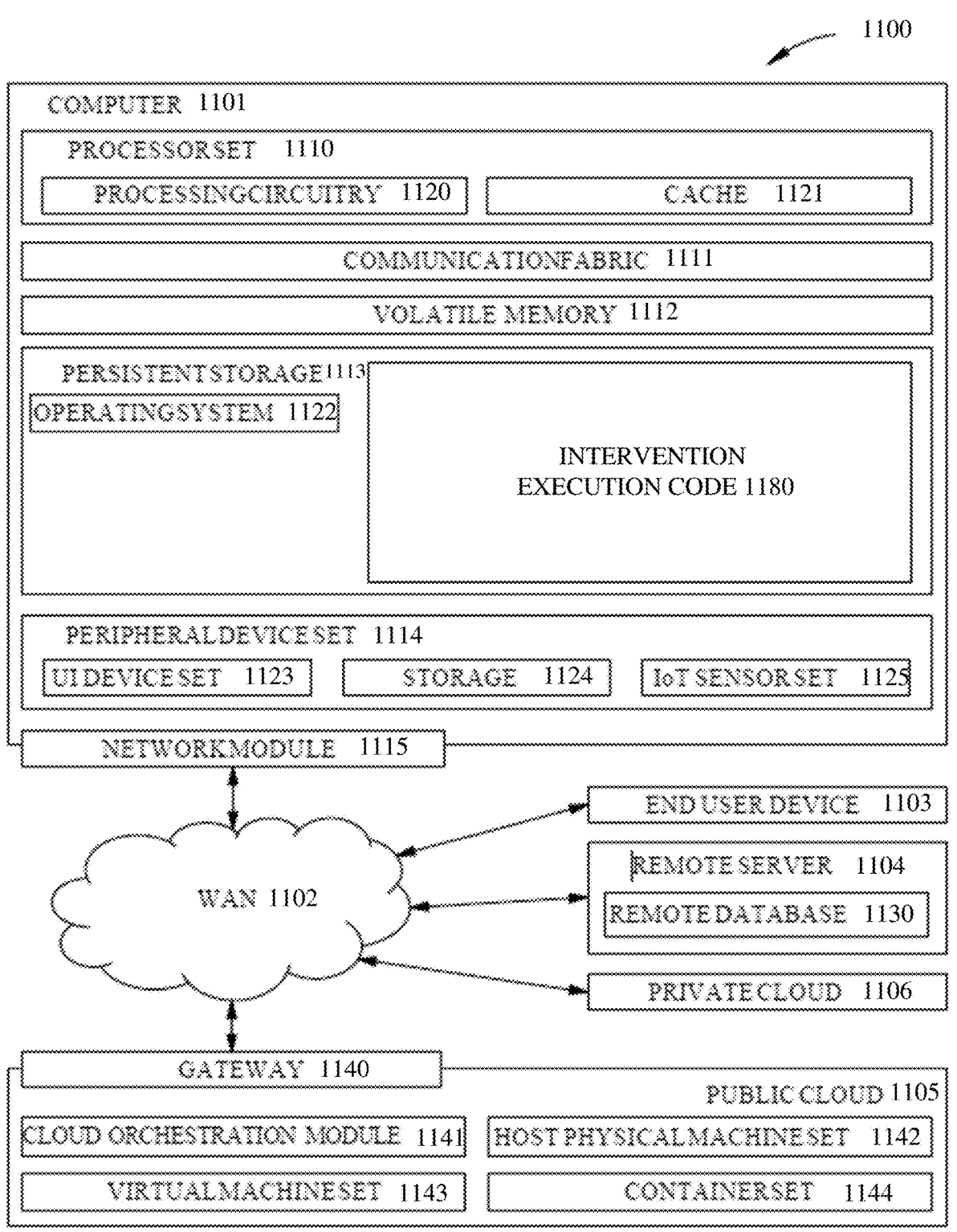
FIG. 11 illustrates a block diagram of an example, non-limiting operating environment in which one or more embodiments described herein can be facilitated. Repetitive description of like elements employed in other embodiments described herein is omitted for sake of brevity.

The operations described herein can be implemented as operations performed by an information/data processing apparatus on information/data stored on one or more computer-readable storage devices or received from other sources. In order to provide a context for the various aspects of the disclosed subject matter, FIG. 11 as well as the following discussion are intended to provide a general description of a suitable environment in which the various aspects of the disclosed subject matter can be implemented. FIG. 11 illustrates a block diagram of an example, non-limiting operating environment in which one or more embodiments described herein can be facilitated. Repetitive description of like elements employed in other embodiments described herein is omitted for sake of brevity. The operations described herein can be implemented as operations performed by an information/data processing apparatus on information/data stored on one or more computer-readable storage devices or received from other sources.

In order to provide a context for the various aspects of the disclosed subject matter, FIG. 11 as well as the following discussion are intended to provide a general description of a suitable environment in which the various aspects of the disclosed subject matter can be implemented. FIG. 11 illustrates a block diagram of an example, non-limiting operating environment in which one or more embodiments described herein can be facilitated. Repetitive description of like elements employed in other embodiments described herein is omitted for sake of brevity.

The illustrated embodiments described herein can be employed relative to distributed computing environments (e.g., cloud computing environments), where certain tasks are performed by remote processing devices that are linked through a communications network. In a distributed computing environment, program modules can be located both in local and/or remote memory storage devices.

Moreover, the non-limiting intervention system 102 and/or the example operating environment 1100 can be associated with and/or be included in a data analytics system, a data processing system, a graph analytics system, a graph processing system, a big data system, a social network system, a speech recognition system, an image recognition system, a graphical modeling system, a bioinformatics system, a data compression system, an artificial intelligence system, an authentication system, a syntactic pattern recognition system, a medical system, a health monitoring system, a network system, a computer network system, a communication system, a router system, a server system, a high availability server system (e.g., a Telecom server system), a Web server system, a file server system, a data server system, a disk array system, a powered insertion board system, a cloud-based system and/or the like. In accordance therewith, non-limiting intervention system 102 and/or example operating environment 1100 can be employed to use hardware and/or software to solve problems that are highly technical in nature, that are not abstract and/or that cannot be performed as a set of mental acts by a human.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Moreover, the non-limiting intervention system 102 and/or the example operating environment 900 can be associated with and/or be included in a data analytics system, a data processing system, a graph analytics system, a graph processing system, a big data system, a social network system, a speech recognition system, an image recognition system, a graphical modeling system, a bioinformatics system, a data compression system, an artificial intelligence system, an authentication system, a syntactic pattern recognition system, a medical system, a health monitoring system, a network system, a computer network system, a communication system, a router system, a server system, a high availability server system (e.g., a Telecom server system), a Web server system, a file server system, a data server system, a disk array system, a powered insertion board system, a cloud-based system and/or the like. In accordance therewith, non-limiting intervention system 102 and/or example operating environment 900 can be employed to use hardware and/or software to solve problems that are highly technical in nature, that are not abstract and/or that cannot be performed as a set of mental acts by a human.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

FIG. 11 includes computing environment 1100 as an example of an environment for the execution of at least some of the computer code involved in performing the inventive methods, such as implementation of an intervention component (e.g., modifying component 134) by intervention component execution code 1180. In addition to block 1180, computing environment 1100 includes, for example, computer 1101, wide area network (WAN) 1102, end user device (EUD) 1103, remote server 1104, public cloud 1105, and private cloud 1106. In this embodiment, computer 1101 includes processor set 1110 (including processing circuitry 1120 and cache 1121), communication fabric 1111, volatile memory 1112, persistent storage 1113 (including operating system 1122 and block 1180, as identified above), peripheral device set 1114 (including user interface (UI), device set 1123, storage 1124, and Internet of Things (IoT) sensor set 1125), and network module 1115. Remote server 1104 includes remote database 1130. Public cloud 1105 includes gateway 1140, cloud orchestration module 1141, host physical machine set 1142, virtual machine set 1143, and container set 1144.

COMPUTER 1101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 1130. As is well understood in the art of computer technology, and depending upon the technology, performance of a computer-implemented method may be distributed among multiple computers and/or between multiple locations. On the other hand, in this presentation of computing environment 1100, detailed discussion is focused on a single computer, specifically computer 1101, to keep the presentation as simple as possible. Computer 1101 may be located in a cloud, even though it is not shown in a cloud in FIG. 11. On the other hand, computer 1101 is not required to be in a cloud except to any extent as may be affirmatively indicated.

PROCESSOR SET 1110 includes one, or more, computer processors of any type now known or to be developed in the future. Processing circuitry 1120 may be distributed over multiple packages, for example, multiple, coordinated integrated circuit chips. Processing circuitry 1120 may implement multiple processor threads and/or multiple processor cores. Cache 1121 is memory that is located in the processor chip package(s) and is typically used for data or code that should be available for rapid access by the threads or cores running on processor set 1110. Cache memories are typically organized into multiple levels depending upon relative proximity to the processing circuitry. Alternatively, some, or all, of the cache for the processor set may be located "off chip." In some computing environments, processor set 1110 may be designed for working with qubits and performing quantum computing.

Computer readable program instructions are typically loaded onto computer 1101 to cause a series of operational steps to be performed by processor set 1110 of computer 1101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 1121 and the other storage media discussed below. The program instructions, and associated data, are accessed by processor set 1110 to control and direct performance of the inventive methods. In computing environment 1100, at least some of the instructions for performing the inventive methods may be stored in block 1180 in persistent storage 1113.

COMMUNICATION FABRIC 1111 is the signal conduction paths that allow the various components of computer 1101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 1112 is any type of volatile memory now known or to be developed in the future. Examples include dynamic type random access memory (RAM) or static type RAM. Typically, the volatile memory is characterized by random access, but this is not required unless affirmatively indicated. In computer 1101, the volatile memory 1112 is located in a single package and is internal to computer 1101, but, alternatively or additionally, the volatile memory may be distributed over multiple packages and/or located externally with respect to computer 1101.

PERSISTENT STORAGE 1113 is any form of non-volatile storage for computers that is now known or to be developed in the future. The non-volatility of this storage means that the stored data is maintained regardless of whether power is being supplied to computer 1101 and/or directly to persistent storage 1113. Persistent storage 1113 may be a read only memory (ROM), but typically at least a portion of the persistent storage allows writing of data, deletion of data and re-writing of data. Some familiar forms of persistent storage include magnetic disks and solid state storage devices. Operating system 1122 may take several forms, such as various known proprietary operating systems or open source Portable Operating System Interface type operating systems that employ a kernel. The code included in block 1180 typically includes at least some of the computer code involved in performing the inventive methods.

PERIPHERAL DEVICE SET 1114 includes the set of peripheral devices of computer 1101. Data communication connections between the peripheral devices and the other components of computer 1101 may be implemented in various ways, such as Bluetooth connections, Near-Field Communication (NFC) connections, connections made by cables (such as universal serial bus (USB) type cables), insertion type connections (for example, secure digital (SD) card), connections made though local area communication networks and even connections made through wide area networks such as the internet. In various embodiments, UI device set 1123 may include components such as a display screen, speaker, microphone, wearable devices (such as goggles and smart watches), keyboard, mouse, printer, touchpad, game controllers, and haptic devices. Storage 1124 is external storage, such as an external hard drive, or insertable storage, such as an SD card. Storage 1124 may be persistent and/or volatile. In some embodiments, storage 1124 may take the form of a quantum computing storage device for storing data in the form of qubits. In embodiments where computer 1101 is required to have a large amount of storage (for example, where computer 1101 locally stores and manages a large database) then this storage may be provided by peripheral storage devices designed for storing very large amounts of data, such as a storage area network (SAN) that is shared by multiple, geographically distributed computers. IoT sensor set 1125 is made up of sensors that can be used in Internet of Things applications. For example, one sensor may be a thermometer and another sensor may be a motion detector.

NETWORK MODULE 1115 is the collection of computer software, hardware, and firmware that allows computer 1101 to communicate with other computers through WAN 1102. Network module 1115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 1115 are performed on the same physical hardware device. In other embodiments (for example, embodiments that utilize software-defined networking (SDN)), the control functions and the forwarding functions of network module 1115 are performed on physically separate devices, such that the control functions manage several different network hardware devices. Computer readable program instructions for performing the inventive methods can typically be downloaded to computer 1101 from an external computer or external storage device through a network adapter card or network interface included in network module 1115.

WAN 1102 is any wide area network (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 1103 is any computer system that is used and controlled by an end user (for example, a customer of an enterprise that operates computer 1101), and may take any of the forms discussed above in connection with computer 1101. EUD 1103 typically receives helpful and useful data from the operations of computer 1101. For example, in a hypothetical case where computer 1101 is designed to provide a recommendation to an end user, this recommendation would typically be communicated from network module 1115 of computer 1101 through WAN 1102 to EUD 1103. In this way, EUD 1103 can display, or otherwise present, the recommendation to an end user. In some embodiments, EUD 1103 may be a client device, such as thin client, heavy client, mainframe computer, desktop computer and so on.

REMOTE SERVER 1104 is any computer system that serves at least some data and/or functionality to computer 1101. Remote server 1104 may be controlled and used by the same entity that operates computer 1101. Remote server 1104 represents the machine(s) that collect and store helpful and useful data for use by other computers, such as computer 1101. For example, in a hypothetical case where computer 1101 is designed and programmed to provide a recommendation based on historical data, then this historical data may be provided to computer 1101 from remote database 1130 of remote server 1104.

PUBLIC CLOUD 1105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 1105 is performed by the computer hardware and/or software of cloud orchestration module 1141. The computing resources provided by public cloud 1105 are typically implemented by virtual computing environments that run on various computers making up the computers of host physical machine set 1142, which is the universe of physical computers in and/or available to public cloud 1105. The virtual computing environments (VCEs) typically take the form of virtual machines from virtual machine set 1143 and/or containers from container set 1144. It is understood that these VCEs may be stored as images and may be transferred among and between the various physical machine hosts, either as images or after instantiation of the VCE. Cloud orchestration module 1141 manages the transfer and storage of images, deploys new instantiations of VCEs and manages active instantiations of VCE deployments. Gateway 1140 is the collection of computer software, hardware, and firmware that allows public cloud 1105 to communicate through WAN 1102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 1106 is similar to public cloud 1105, except that the computing resources are only available for use by a single enterprise. While private cloud 1106 is depicted as being in communication with WAN 1102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 1105 and private cloud 1106 are both part of a larger hybrid cloud.

What is claimed is:

1. A system comprising:
a memory that stores computer-executable components; and
a processor, operatively coupled to the memory, that executes at least one of the computer-executable components that:
identifies qualitative information associated with predictions generated by a forecasting neural network model during historical operations of an industrial process, wherein the qualitative information is specified in a descriptive language, and wherein the forecasting neural network model was trained using a training dataset comprising historical quantitative data obtained from equipment used in the industrial process during the historical operations of the industrial process,
identifies a subset of the training dataset associated with a portion of the forecasting neural network model associated with erroneous predictions of the predictions based on a defined criterion associated with at least one of sensitivity of prediction or quantity of training data;
identifies a subset of the qualitative information associated with the subset of the training dataset;
generates intervention information based on the subset of the qualitative information and the subset of the training dataset, wherein the generating comprises converting the subset of the qualitative information from the descriptive language into a declarative language;
retrains the forecasting neural network model using the intervention information to mitigate the erroneous predictions associated with the portion of the forecasting neural network model; and
controls, using the retrained forecasting neural network model, operations of the industrial process.

2. The system of claim 1, wherein the qualitative information comprises an indication that a portion of the industrial process operates differently than has been modeled by the forecasting neural network model.

3. The system of claim 2, wherein the indication comprises qualitative monotonic information regarding a prediction and an operation of the industrial process.

4. The system of claim 1, wherein identifying the subset of the training dataset comprises identifying the subset of the training dataset associated with a portion of the industrial process where collecting certain data is dangerous.

5. The system of claim 1, wherein identifying the subset of the training dataset comprises identifying the subset of the training dataset associated with a portion of the industrial process associated with a lower quantity of training data than other portions of the industrial process.

6. The system of claim 1, wherein identifying the subset of the training dataset comprises identifying the subset of the training dataset associated with a portion of the industrial process wherein collecting certain data would be destructive to the industrial process.

7. The system of claim 1, wherein the intervention information comprises at least one intervention.

8. The system of claim 7, wherein generating the intervention information further comprises generating at least one metric to evaluate the at least one intervention.

9. A computer-implemented method, comprising:
identifying, by a system operatively coupled to a processor, qualitative information associated with predictions generated by a forecasting neural network model during historical operations of an industrial process, wherein the qualitative information is specified in a descriptive language, and wherein the forecasting neural network model was trained using a training dataset comprising historical quantitative data obtained from equipment used in the industrial process during the historical operations of the industrial process;
identifying, by the system, a subset of the training dataset associated with a portion of the forecasting neural network model associated with erroneous predictions of the predictions based on a defined criterion associated with at least one of sensitivity of prediction or quantity of training data;
identifying, by the system, a subset of the qualitative information associated with the subset of the training dataset;
generating, by the system, intervention information based on the subset of the qualitative information and the subset of the training dataset, wherein the generating comprises converting the subset of the qualitative information from the descriptive language into a declarative language;
retraining, by the system, the forecasting neural network model using the intervention information to mitigate the erroneous predictions associated with the portion of the forecasting neural network model; and
controlling, by the system, using the retrained forecasting neural network model, operations of the industrial process.

10. The computer-implemented method of claim 9, wherein the qualitative information comprises an indication that a portion of the industrial process operates differently than has been modeled by the forecasting neural network model.

11. The computer-implemented method of claim 10, wherein the indication comprises qualitative monotonic information regarding a prediction and an operation of the industrial process.

12. The computer-implemented method of claim 9, wherein identifying the subset of the training dataset comprises identifying the subset of the training dataset associated with a portion of the industrial process where collecting certain data is dangerous.

13. The computer-implemented method of claim 9, wherein identifying the subset of the training dataset comprises identifying the subset of the training dataset associated with a portion of the industrial process associated with a lower quantity of training data than other portions of the industrial process.

14. The computer-implemented method of claim 9, wherein identifying the subset of the training dataset comprises identifying the subset of the training dataset associated with a portion of the industrial process wherein collecting certain data would be destructive to the industrial process.

15. A computer program product comprising a computer readable storage medium having program instructions embodied therewith, wherein the program instructions are executable by a processor to cause the processor to:

identify qualitative information associated with predictions generated by a forecasting neural network model during historical operations of an industrial process, wherein the qualitative information is specified in a descriptive language, and wherein the forecasting neural network model was trained using a training dataset comprising historical quantitative data obtained from equipment used in the industrial process during the historical operations of the industrial process;

identify a subset of the training dataset associated with a portion of the forecasting neural network model associated with erroneous predictions of the predictions based on a defined criterion associated with at least one of sensitivity of prediction or quantity of training data;

identify a subset of the qualitative information associated with the subset of the training dataset;

generate intervention information based on the subset of the qualitative information and the subset of the training dataset, wherein the generating comprises converting the subset of the qualitative information from the descriptive language into a declarative language;

retrain the forecasting neural network model using the intervention information to mitigate the erroneous predictions associated with the portion of the forecasting neural network model; and control, using the retrained forecasting neural network model, operations of the industrial process.

16. The computer program product of claim 15, wherein the qualitative information comprises an indication that a portion of the industrial process operates differently than has been modeled by the forecasting neural network model.

17. The computer program product of claim 16, wherein the indication comprises qualitative monotonic information regarding a prediction and an operation of the industrial process.

18. The computer program product of claim 15, wherein identifying the subset of the training dataset comprises identifying the subset of the training dataset associated with a portion of the industrial process where collecting certain data is dangerous.

19. The computer program product of claim 15, wherein identifying the subset of the training dataset comprises identifying the subset of the training dataset associated with a portion of the industrial process associated with a lower quantity of training data than other portions of the industrial process.

20. The computer program product of claim 15, wherein identifying the subset of the training dataset comprises identifying the subset of the training dataset associated with a portion of the industrial process wherein collecting certain data would be destructive to the industrial process.

* * * * *